US010403265B2

(12) United States Patent
Maruta

(10) Patent No.: US 10,403,265 B2
(45) Date of Patent: Sep. 3, 2019

(54) VOICE RECOGNITION APPARATUS AND VOICE RECOGNITION METHOD

(71) Applicant: MITSUBISHI ELECTRIC CORPORATION, Tokyo (JP)

(72) Inventor: Yuzo Maruta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 108 days.

(21) Appl. No.: 15/525,716

(22) PCT Filed: Dec. 24, 2014

(86) PCT No.: PCT/JP2014/084105
§ 371 (c)(1),
(2) Date: May 10, 2017

(87) PCT Pub. No.: WO2016/103358
PCT Pub. Date: Jun. 30, 2016

(65) Prior Publication Data

US 2018/0240455 A1 Aug. 23, 2018

(51) Int. Cl.
*G10L 15/00* (2013.01)
*G10L 15/06* (2013.01)
(Continued)

(52) U.S. Cl.
CPC ........ *G10L 15/005* (2013.01); *G01C 21/3608* (2013.01); *G06F 17/2735* (2013.01);
(Continued)

(58) Field of Classification Search
CPC ....... G10L 15/063; G10L 15/08; G10L 15/20; G10L 15/22; G10L 15/14; G10L 15/142;
(Continued)

(56) References Cited

U.S. PATENT DOCUMENTS 6,138,095 A * 10/2000 Gupta .................... G10L 15/08 704/233
6,223,155 B1 * 4/2001 Bayya .................... G10L 15/07 704/243
(Continued)

FOREIGN PATENT DOCUMENTS

EP 1 302 752 A2 4/2003
EP 1 975 923 B1 4/2016
(Continued)

*Primary Examiner* — Anne L Thomas-Homescu
(74) *Attorney, Agent, or Firm* — Birch, Stewart, Kolasch & Birch, LLP

(57) ABSTRACT

An object is to provide a technique that allows voice recognition of voice including a plurality of languages while suppressing a data size of a voice recognition dictionary. A voice recognition dictionary includes a plurality of place name dictionaries and a plurality of house number dictionaries in which phonemes in a different language are mapped to phonemes in a corresponding language. Out of the plurality of place name dictionaries, one place name dictionary is set, which a language-specific voice recognition unit set by a voice recognition language setting unit may perform voice recognition in phonemes of the corresponding language, and out of the plurality of house number dictionaries, one house number dictionary is set, which the language-specific voice recognition unit may perform voice recognition by substituting phonemes in a different language for the phonemes in the corresponding language.

8 Claims, 7 Drawing Sheets

(51) Int. Cl.

| | |
|---|---|
| ***G10L 15/26*** | (2006.01) |
| ***G10L 15/14*** | (2006.01) |
| ***G10L 15/18*** | (2013.01) |
| ***G10L 15/04*** | (2013.01) |
| ***G10L 15/20*** | (2006.01) |
| ***G10L 15/28*** | (2013.01) |
| ***G10L 17/00*** | (2013.01) |
| ***G10L 21/00*** | (2013.01) |
| ***G10L 25/00*** | (2013.01) |
| ***G01C 21/36*** | (2006.01) |
| ***G06F 17/27*** | (2006.01) |
| ***G10L 15/02*** | (2006.01) |
| ***G10L 15/187*** | (2013.01) |
| ***G10L 15/32*** | (2013.01) |

(52) U.S. Cl.
CPC .............. *G10L 15/00* (2013.01); *G10L 15/02* (2013.01); *G10L 15/06* (2013.01); *G10L 15/187* (2013.01); *G10L 15/32* (2013.01); *G10L 2015/025* (2013.01)

(58) Field of Classification Search
CPC ... G10L 15/265; G10L 17/005; H05K 999/99; G06F 17/2785
See application file for complete search history.

(56) References Cited

U.S. PATENT DOCUMENTS 6,292,778 B1 * 9/2001 Sukkar .................... G10L 15/08 704/249
6,470,315 B1 * 10/2002 Netsch .................. G10L 15/187 704/256.5
6,662,159 B2 * 12/2003 Komori ................. G10L 15/142 704/255
6,839,670 B1 * 1/2005 Stammler ............ G10L 15/063 704/251
7,472,061 B1 12/2008 Alewine et al.
8,788,256 B2 7/2014 Chen et al.
9,177,545 B2 11/2015 Maruta
9,230,541 B2 * 1/2016 Ll ......................... G10L 15/083
2002/0116193 A1 * 8/2002 Raddino ............... G10L 15/142 704/251
2002/0152068 A1 10/2002 Neti et al.
2003/0023437 A1 * 1/2003 Fung ................... G10L 15/1815 704/236
2003/0152261 A1 * 8/2003 Hiroe .................... G10L 13/047 382/153
2003/0220796 A1 * 11/2003 Aoyama ................. G10L 15/22 704/275
2004/0015356 A1 * 1/2004 Nakamura ............ G10L 15/063 704/250
2004/0030552 A1 * 2/2004 Omote .................. G10L 15/063 704/245
2005/0027527 A1 * 2/2005 Junkawitsch ........... G10L 15/20 704/243
2005/0197835 A1 9/2005 Reinhard et al.
2005/0256712 A1 * 11/2005 Yamada ................ G10L 15/065 704/255
2006/0074664 A1 * 4/2006 Lam ...................... G10L 15/142 704/255
2006/0277032 A1 * 12/2006 Hernandez-Abrego .................... G10L 15/193 704/9
2007/0219793 A1 * 9/2007 Acero .................. G10L 15/193 704/240
2008/0059188 A1 * 3/2008 Konopka ................ G10L 15/22 704/257
2008/0167872 A1 * 7/2008 Okimoto ................ G10L 15/22 704/251
2008/0177545 A1 * 7/2008 Li ........................ G06F 17/271 704/255
2010/0217593 A1 * 8/2010 Shields ................. G10L 15/144 704/245
2010/0286984 A1 * 11/2010 Wandinger ............. G10L 15/04 704/251
2011/0131043 A1 * 6/2011 Adachi ................... G10L 15/08 704/246
2011/0166855 A1 * 7/2011 Vermeulen ............. G10L 15/32 704/231
2011/0307241 A1 * 12/2011 Waibel ................. G10L 15/265 704/2
2012/0330655 A1 * 12/2012 Osawa .................... G10L 15/20 704/233
2013/0166290 A1 6/2013 Suzuki
2014/0025379 A1 * 1/2014 Ganapathiraju ........ G10L 15/08 704/255
2015/0019220 A1 * 1/2015 Talhami ................ G10L 15/063 704/244
2015/0120288 A1 * 4/2015 Thomson ................ G10L 15/22 704/231
2016/0055850 A1 * 2/2016 Nakadai .................. G10L 15/32 704/235
2016/0086599 A1 * 3/2016 Kurata .................. G10L 15/063 704/243
2016/0240188 A1 * 8/2016 Seto ........................ G10L 15/32
2016/0336008 A1 * 11/2016 Menezes .............. G10L 15/187
2016/0358596 A1 * 12/2016 Singh ...................... G10L 13/08
2016/0372116 A1 * 12/2016 Summerfield .......... G10L 25/63
2017/0032779 A1 * 2/2017 Ahn .................... G06F 17/2705
2017/0076718 A1 * 3/2017 Popovici ............... G10L 15/187
2017/0169814 A1 * 6/2017 Pashine ................... G10L 15/06
2017/0287474 A1 * 10/2017 Maergner ................ G10L 13/08
2018/0197537 A1 * 7/2018 Stajner .................... G10L 15/19

FOREIGN PATENT DOCUMENTS

JP 10-133686 A 5/1998
JP 2003-121166 A 4/2003
JP 2004-101727 A 4/2004
JP 2007-155833 A 6/2007
JP 2008-242462 A 10/2008
JP 2011-33874 A 2/2011
JP 2012-518207 A 8/2012
WO WO 2010/096274 A1 8/2010
WO WO 2011/089651 A1 7/2011

* cited by examiner

F I G. 2
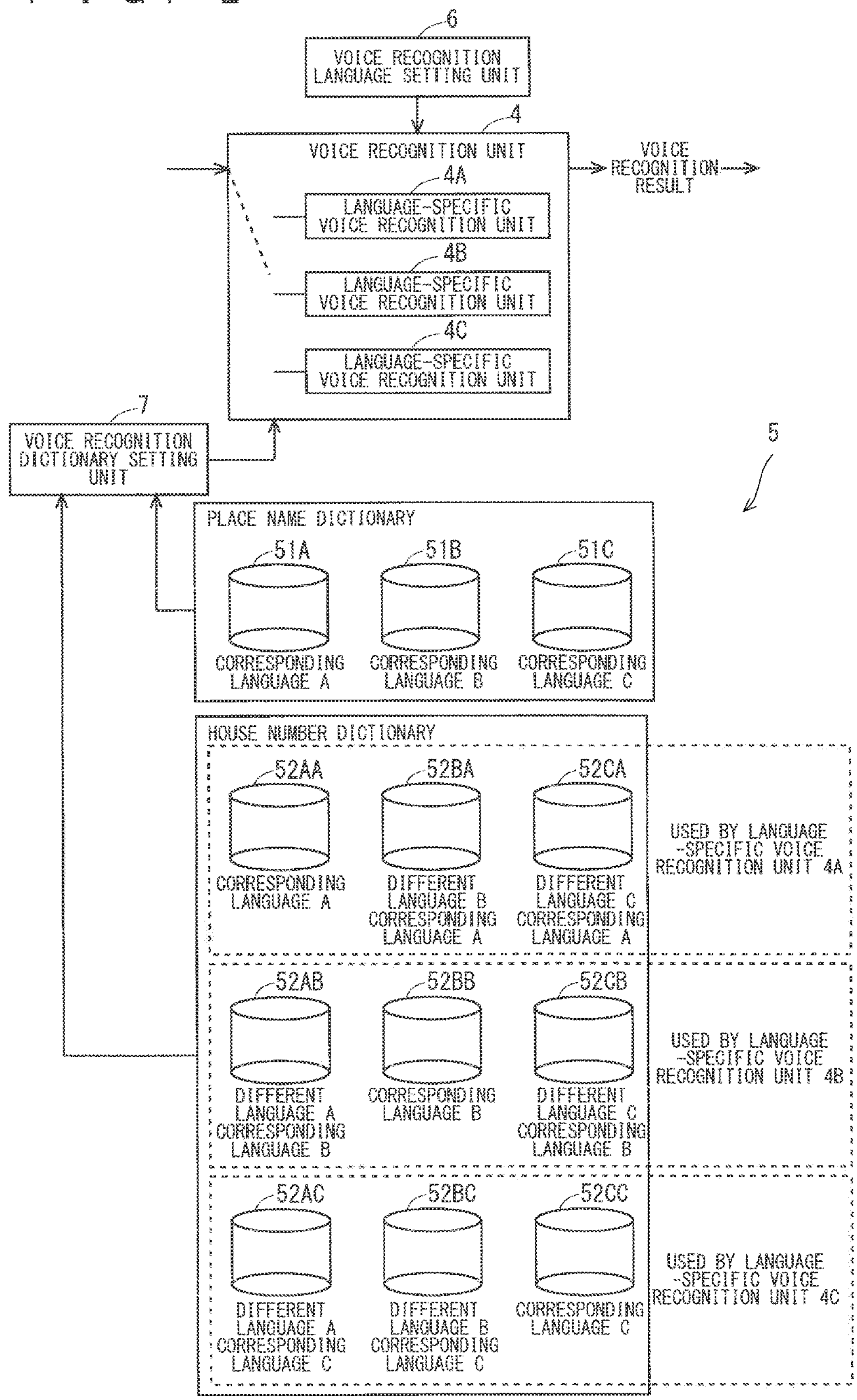

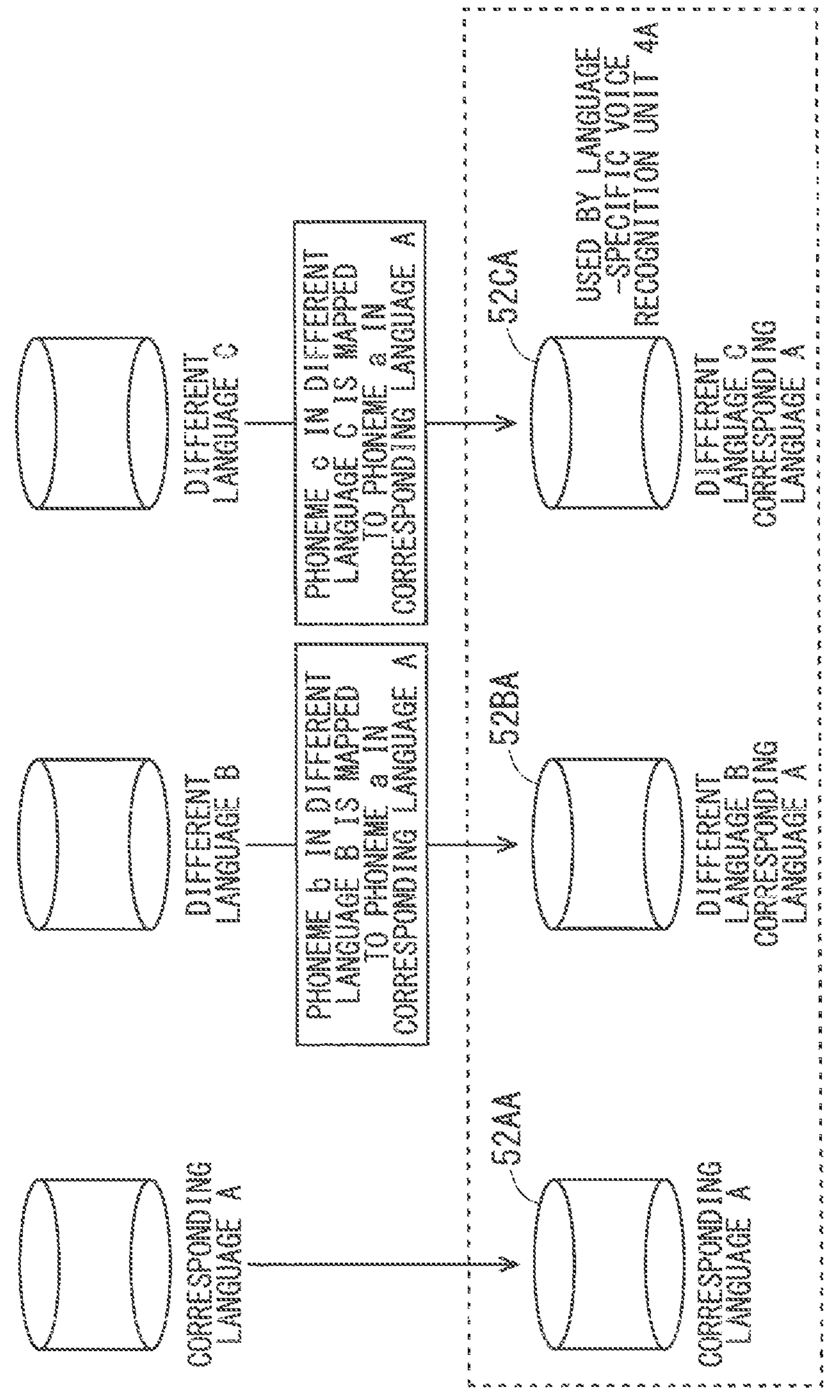
F I G . 4
CORRESPONDING LANGUAGE A
DIFFERENT LANGUAGE B
DIFFERENT LANGUAGE C
PHONEME b IN DIFFERENT LANGUAGE B IS MAPPED TO PHONEME a IN CORRESPONDING LANGUAGE A
PHONEME c IN DIFFERENT LANGUAGE C IS MAPPED TO PHONEME a IN CORRESPONDING LANGUAGE A
52AA
52BA
52CA
CORRESPONDING LANGUAGE A
DIFFERENT LANGUAGE B CORRESPONDING LANGUAGE A
DIFFERENT LANGUAGE C CORRESPONDING LANGUAGE A
USED BY LANGUAGE -SPECIFIC VOICE RECOGNITION UNIT 4A F I G. 5
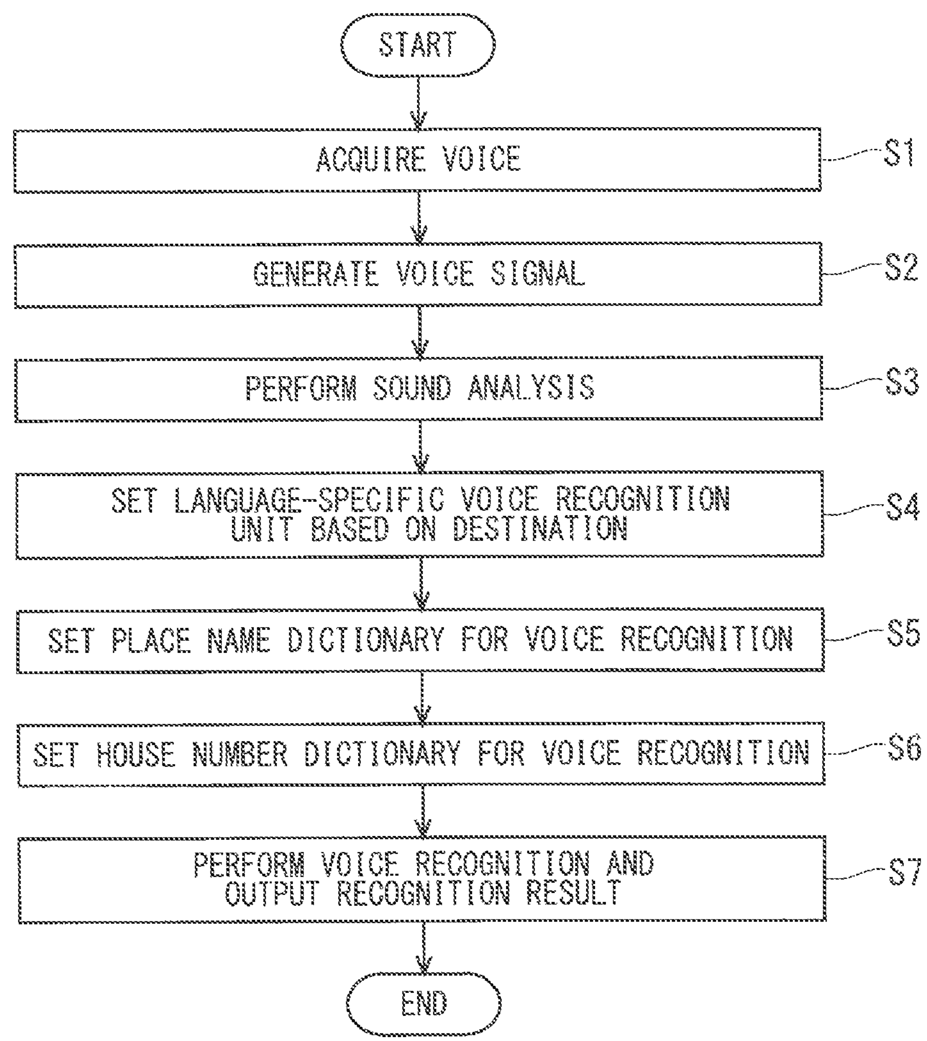

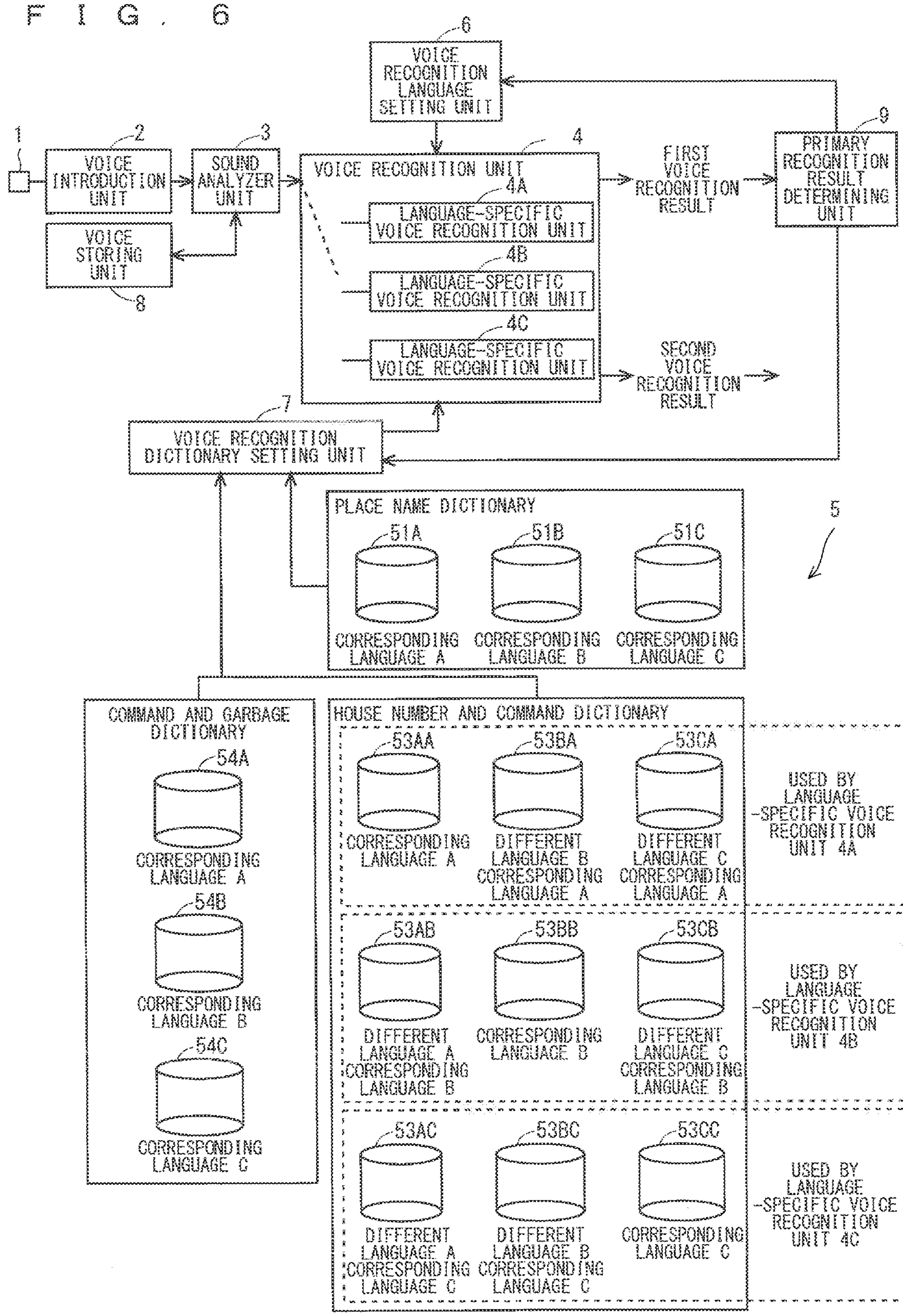
F I G . 6
VOICE RECOGNITION LANGUAGE SETTING UNIT
VOICE INTRODUCTION UNIT
SOUND ANALYZER UNIT
VOICE STORING UNIT
VOICE RECOGNITION UNIT
LANGUAGE-SPECIFIC VOICE RECOGNITION UNIT
FIRST VOICE RECOGNITION RESULT
SECOND VOICE RECOGNITION RESULT
PRIMARY RECOGNITION RESULT DETERMINING UNIT
VOICE RECOGNITION DICTIONARY SETTING UNIT
PLACE NAME DICTIONARY
CORRESPONDING LANGUAGE A
CORRESPONDING LANGUAGE B
CORRESPONDING LANGUAGE C
COMMAND AND GARBAGE DICTIONARY
HOUSE NUMBER AND COMMAND DICTIONARY
DIFFERENT LANGUAGE A CORRESPONDING LANGUAGE B
DIFFERENT LANGUAGE B CORRESPONDING LANGUAGE A
DIFFERENT LANGUAGE C CORRESPONDING LANGUAGE A
USED BY LANGUAGE -SPECIFIC VOICE RECOGNITION UNIT 4A
USED BY LANGUAGE -SPECIFIC VOICE RECOGNITION UNIT 4B
USED BY LANGUAGE -SPECIFIC VOICE RECOGNITION UNIT 4C
DIFFERENT LANGUAGE C CORRESPONDING LANGUAGE B
DIFFERENT LANGUAGE A CORRESPONDING LANGUAGE C
DIFFERENT LANGUAGE B CORRESPONDING LANGUAGE C
1
2
3
4
4A
4B
4C
5
6
7
8
9
51A
51B
51C
53AA
53BA
53CA
53AB
53BB
53CB
53AC
53BC
53CC
54A
54B
54C

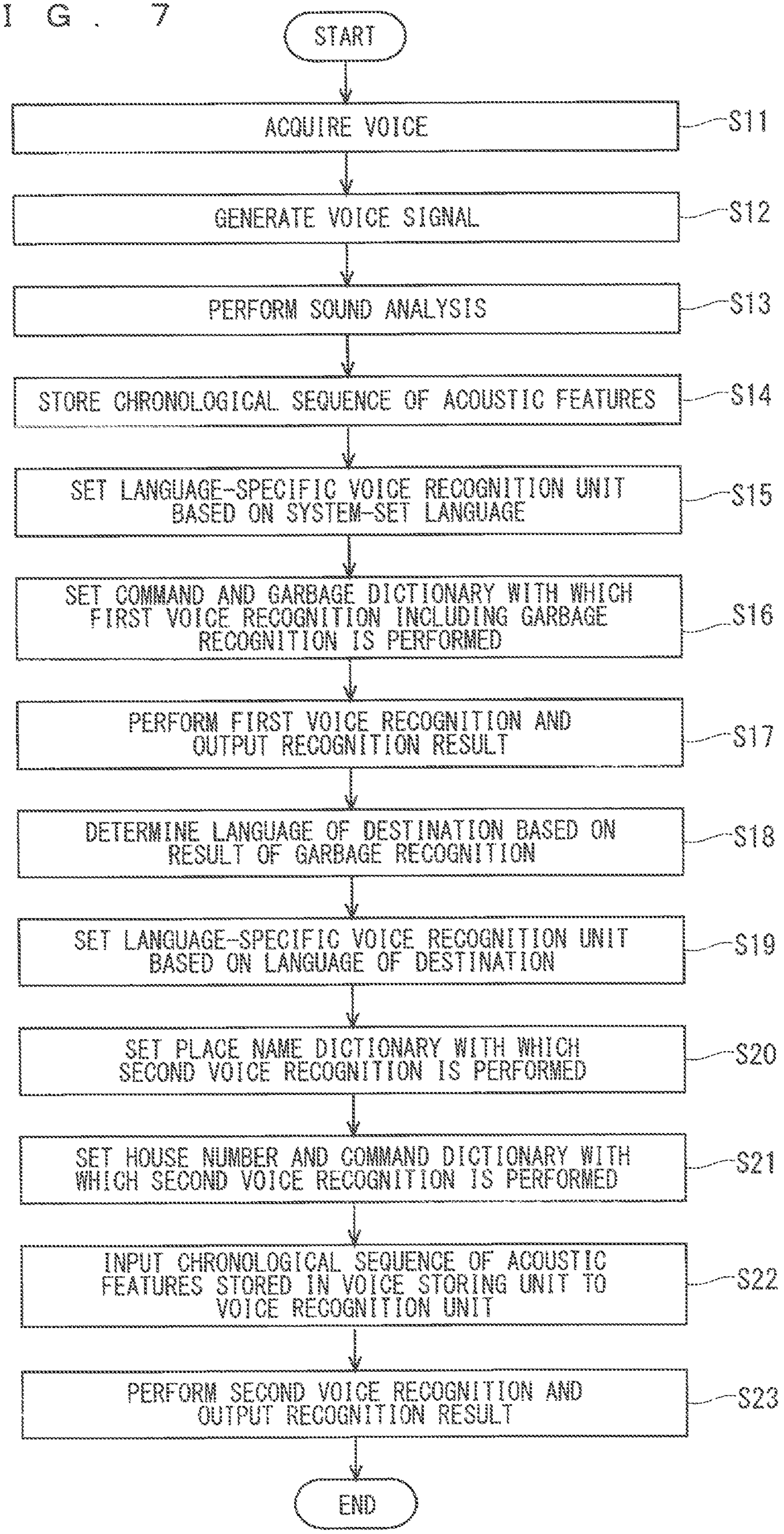
F I G. 7
START
ACQUIRE VOICE
S11
GENERATE VOICE SIGNAL
S12
PERFORM SOUND ANALYSIS
S13
STORE CHRONOLOGICAL SEQUENCE OF ACOUSTIC FEATURES
S14
SET LANGUAGE-SPECIFIC VOICE RECOGNITION UNIT BASED ON SYSTEM-SET LANGUAGE
S15
SET COMMAND AND GARBAGE DICTIONARY WITH WHICH FIRST VOICE RECOGNITION INCLUDING GARBAGE RECOGNITION IS PERFORMED
S16
PERFORM FIRST VOICE RECOGNITION AND OUTPUT RECOGNITION RESULT
S17
DETERMINE LANGUAGE OF DESTINATION BASED ON RESULT OF GARBAGE RECOGNITION
S18
SET LANGUAGE-SPECIFIC VOICE RECOGNITION UNIT BASED ON LANGUAGE OF DESTINATION
S19
SET PLACE NAME DICTIONARY WITH WHICH SECOND VOICE RECOGNITION IS PERFORMED
S20
SET HOUSE NUMBER AND COMMAND DICTIONARY WITH WHICH SECOND VOICE RECOGNITION IS PERFORMED
S21
INPUT CHRONOLOGICAL SEQUENCE OF ACOUSTIC FEATURES STORED IN VOICE STORING UNIT TO VOICE RECOGNITION UNIT
S22
PERFORM SECOND VOICE RECOGNITION AND OUTPUT RECOGNITION RESULT
S23
END

VOICE RECOGNITION APPARATUS AND VOICE RECOGNITION METHOD

TECHNICAL FIELD

The present invention relates to a voice recognition apparatus capable of performing voice recognition, and a voice recognition method.

BACKGROUND ART

There is proposed a navigation system having a voice recognition apparatus built therein to allow voice recognition of voice from a user so that an address may be input. When such a navigation system is used in an area like Europe, a language that is set as a language used in the navigation system (hereinafter referred to as a "system-set language") is different from a language expressing a destination. For example, in a case in which a user is an English and a destination of an address is in Germany, it is expected that a system-set language is English and a language expressing a destination is German.

Here, phonemes (equivalent to phonetic symbols) for a place name for performing voice recognition of the place name are provided by a map-making company, which are typically phonemes in a language mainly used in an area of the place name. For example, German phonemes are used as phonemes for a name of a place in Germany. Accordingly, when a language expressing a destination is German, it is desirable in terms of efficiency to use a voice recognition dictionary containing German phonemes provided by a map-making company, and a voice recognition engine for German corresponding to the dictionary.

On the other hand, it is common that a native language of a user is used as a system-set language. Accordingly, when the system-set language is English, it is desirable to use a voice recognition engine for English.

Therefore, in a case in which the system-set language is English and the language expressing a destination is German, a voice recognition dictionary desirable for the language expressing a destination would be different from a voice recognition dictionary desirable for the system-set language.

However, as some of the phonemes (pronunciation) contained in one of English and German languages are not contained in the other of the languages, there has been a problem that a voice recognition engine for one of English and German languages may not handle the phonemes for the other of the languages.

In order to solve this problem, there is proposed a technique using a voice recognition dictionary in which a phoneme a in a language A is associated with one in phonemes b of a language B that is identical or most similar to the phoneme a (e.g., Patent Document 1). Using such a voice recognition dictionary allows phonemes in the language A to be substituted for phonemes in the language B to perform voice recognition with the voice recognition engine in the language B. Hereinafter, in a voice recognition dictionary, associating phonemes in one language with phonemes in a different language is also referred to as "phoneme mapping".

PRIOR ART DOCUMENTS

Patent Documents

Patent Document 1: Japanese Patent Application Laid-Open No. 2011-033874

SUMMARY OF INVENTION

Problems to be Solved by the Invention

However, a conventional voice recognition apparatus has problems that voice recognition of voice including a plurality of languages cannot be performed, and that a data size of a voice recognition dictionary in which phoneme mapping has been applied as described above is relatively large.

Thus, the present invention is made in view of the above problems, and its object is to provide a technique that allows voice recognition of voice including a plurality of languages while suppressing a data size of a voice recognition dictionary.

Means for Solving the Problems

A voice recognition apparatus according to the present invention includes a voice recognition dictionary defining a glossary which is a target for voice recognition; and a voice recognition processing circuit configured to perform voice recognition of input voice using the voice recognition dictionary. The voice recognition processing circuit includes a plurality of language-specific voice recognition processing circuits capable of performing the voice recognition using phonemes in respective predetermined languages. The voice recognition dictionary includes a plurality of first dictionaries with which each of the plurality of language-specific voice recognition processing circuits performs the voice recognition of a first glossary which is one of the glossary using phonemes in the corresponding language as the language that corresponds to each of the language-specific voice recognition processing circuits, and a plurality of second dictionaries each being used by each of the plurality of language-specific voice recognition processing circuits to substitute phonemes in a different language as the language different from the corresponding language for phonemes in the corresponding language to perform the voice recognition of a second glossary which is another of the glossary which is another of the glossary, the second dictionaries in each of which, for the second glossary, phonemes in the different language are mapped to phonemes in the corresponding language. The voice recognition apparatus further includes: a voice recognition language setting processing circuit configured to set the language-specific voice recognition processing circuit to be used in the voice recognition, out of the plurality of language-specific voice recognition processing circuits; and a voice recognition dictionary setting processing circuit configured to set, out of the plurality of first dictionaries, the first dictionary with which the language-specific voice recognition processing circuit set by the voice recognition language setting processing circuit performs the voice recognition of the first glossary using phonemes in the corresponding language; and to set, out of the plurality of second dictionaries, the second dictionary with which the language-specific voice recognition processing circuit set by the voice recognition language setting processing circuit performs the voice recognition of the second glossary by substituting phonemes in the different language for the corresponding language.

A voice recognition method according to the present invention includes the steps of: preparing a voice recognition dictionary defining a glossary which is a target for voice recognition; and performing voice recognition of input voice using the voice recognition dictionary. Performing the voice recognition includes preparing a plurality of language-specific voice recognition processing circuits capable of performing the voice recognition using phonemes in respective predetermined languages. Preparing the voice recognition dictionary includes preparing a plurality of first dictionaries with which each of the plurality of language-specific voice recognition processing circuits performs the voice recognition of a first glossary which is one of the glossary using phonemes in the corresponding language as the language that corresponds to each of the language-specific voice recognition processing circuits, and a plurality of second dictionaries each being used by each of the plurality of language-specific voice recognition processing circuits to substitute phonemes in a different language as the language different from the corresponding language for phonemes in the corresponding language to perform the voice recognition of a second glossary which is another of the glossary, the second dictionaries in each of which, for a second glossary, phonemes in the different language are mapped to phonemes in the corresponding language. The voice recognition method further includes: setting the language-specific voice recognition processing circuit to be used in the voice recognition, out of the plurality of language-specific voice recognition processing circuits; and setting, out of the plurality of first dictionaries, the first dictionary with which the language-specific voice recognition processing circuit performs the voice recognition of the first glossary using phonemes in the corresponding language, and out of the plurality of second dictionaries, the second dictionary with which the language-specific voice recognition processing circuit performs the voice recognition of the second glossary by substituting phonemes in the different language for phonemes in the corresponding language.

Effects of the Invention

According to the present invention, it is possible to perform voice recognition of voice including a plurality of languages while suppressing a data size of a voice recognition dictionary.

Objects, features, aspects, and advantages of the present invention will become more apparent from the following detailed description along with the accompanying drawings.

BRIEF DESCRIPTION OF DRAWINGS

FIG. 2 is a block diagram illustrating a main configuration of the voice recognition apparatus according to Embodiment 1.

FIG. 4 is a diagram illustrating phoneme mapping according to Embodiment 1.

FIG. 5 is a flowchart showing an operation of the voice recognition apparatus according to Embodiment 1.

FIG. 6 is a block diagram illustrating a configuration of a voice recognition apparatus according to Embodiment 2.

FIG. 7 is a flowchart showing an operation of the voice recognition apparatus according to Embodiment 2.

DESCRIPTION OF EMBODIMENTS

Embodiment 1

Hereinafter, description is given taking a configuration in which a voice recognition apparatus according to Embodiment 1 of the present invention is built within a navigation system (or a navigation device) as an example.

Figure 1:
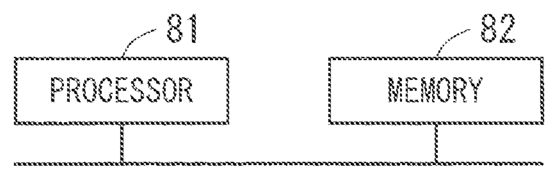
FIG. 1 is a block diagram illustrating a hardware configuration of a voice recognition apparatus according to Embodiment 1.

FIG. 1 is a block diagram illustrating a hardware configuration of a voice recognition apparatus according to this Embodiment 1. The voice recognition apparatus in FIG. 1 includes a processor 81 constituted for example by a CPU (Central Processing Unit), and a memory 82 constituted for example by a semiconductor memory.

FIG. 2 is a block diagram illustrating a main functional configuration of the voice recognition apparatus according to Embodiment 1. The voice recognition apparatus in FIG. 2 includes a voice recognition unit 4, a voice recognition dictionary 5, a voice recognition language setting unit 6, and a voice recognition dictionary setting unit 7. Here, the voice recognition unit 4, the voice recognition language setting unit 6, and the voice recognition dictionary setting unit 7 are realized, by the processor 81 in FIG. 1 executing programs stored in a storage device such as the memory 82, as functions of the processor 81. It should be noted that these functions may be realized by a plurality of processors 81 in cooperation. The voice recognition dictionary 5 corresponds to a storage device such as the memory 82 in FIG. 1 and an HDD (Hard Disk Drive) that is not illustrated.

Figure 3:
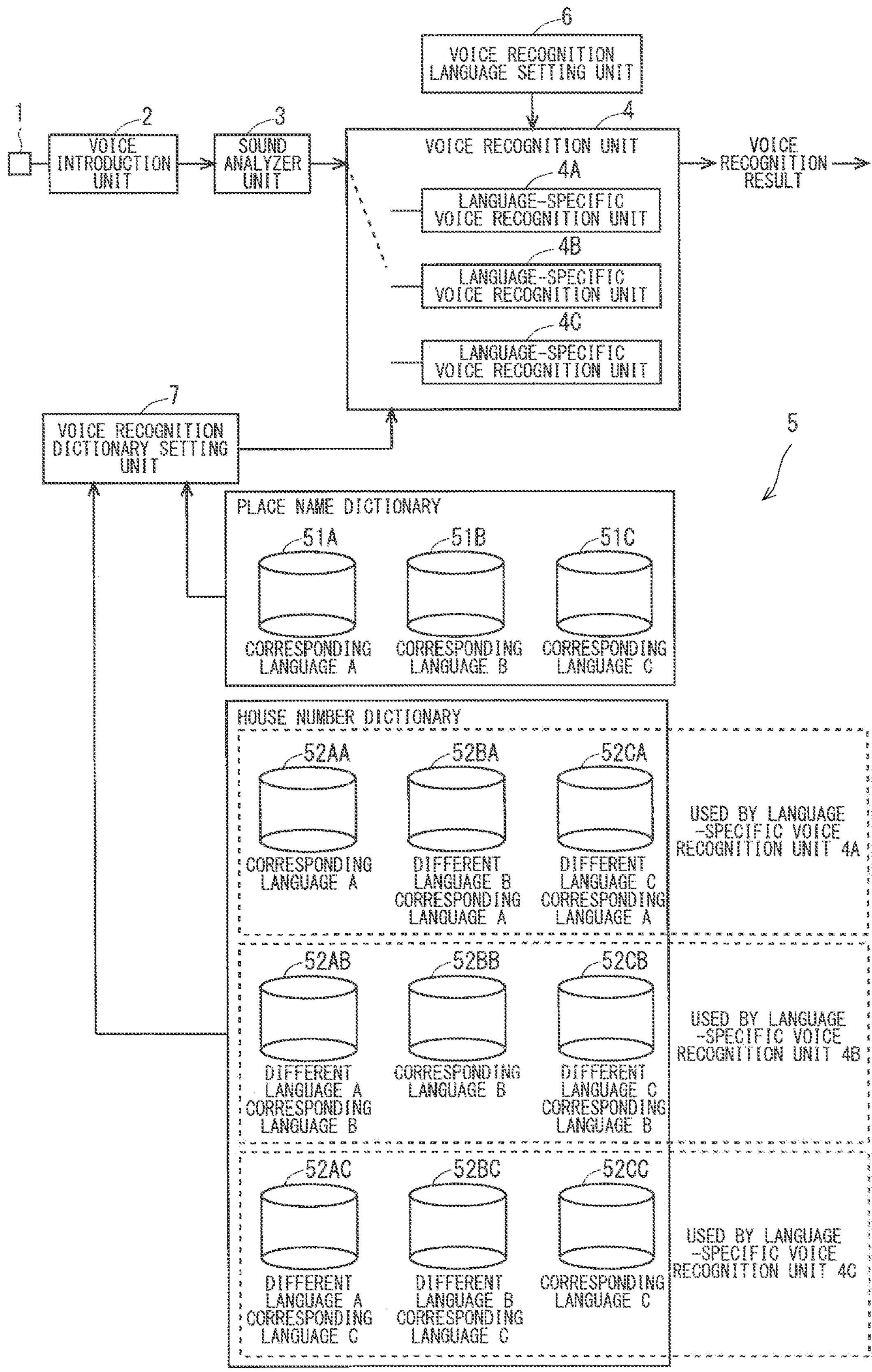
FIG. 3 is a block diagram illustrating a configuration of the voice recognition apparatus according to Embodiment 1.

FIG. 3 is block diagram illustrating a main functional configuration and an additional functional configuration of the voice recognition apparatus. Here, the additional configuration that is illustrated only in FIG. 3 is a configuration only indirectly related to the present invention, and various other configurations may be employed other than the configuration described below. The voice recognition apparatus in FIG. 3 includes, in addition to the components in FIG. 2, a voice input unit 1, a voice introduction unit 2, and a sound analyzer unit 3.

Next, components of the voice recognition apparatus according to this Embodiment 1 illustrated in FIG. 2 and FIG. 3 will be described in detail.

The voice input unit 1 acquires voice from outside (e.g., a user). The voice introduction unit 2 converts the voice acquired by the voice input unit 1 into a digital signed to generate a voice signal. The sound analyzer unit 3 analyzes the voice signal, and converts the voice signal into a vector sequence or a chronological sequence of acoustic features.

The voice recognition unit 4 performs voice recognition of input voice (a vector sequence or a chronological sequence of acoustic features), by using the voice recognition dictionary 5 that defines a glossary which is a target for voice recognition. As a result, the voice recognition unit 4 outputs a word or term that is most probable out of the glossary of the voice recognition dictionary 5.

In this Embodiment 1, the voice recognition unit 4 includes language-specific voice recognition units 4A, 4B, and 4C as a plurality of language-specific voice recognition units (hereinafter collectively referred to as the "language-specific voice recognition units 4A-4C").

The language-specific voice recognition units 4A-4C are voice recognition engines capable of performing voice recognition using phonemes in respective predetermined languages. For example, the language-specific voice recognition unit 4A has an acoustic model (not illustrated) for recognition in a language A that corresponds to the language-specific voice recognition unit 4A, and is able to perform voice recognition using phonemes in the language A. The language-specific voice recognition unit 4B and the language-specific voice recognition unit 4C are also configured similarly, and are able to perform voice recognition using phonemes in a language B and a language C that respectively correspond to the language-specific voice recognition unit 4B and the language-specific voice recognition unit 4C.

It should be noted that in the following description, a language corresponding to one of the language-specific voice recognition units 4A-4C is referred to as a "corresponding language", and a language different from the corresponding language is referred to as a "different language". Specifically, the language A is a corresponding language A for the language-specific voice recognition unit 4A, and a different language A for the language-specific voice recognition unit 4B.

By using one of the language-specific voice recognition units 4A-4C, the voice recognition unit 4 is able to perform voice recognition in one of corresponding languages A-C as appropriate.

The voice recognition dictionary 5 defines a glossary which is a target for voice recognition. In this Embodiment 1, the voice recognition dictionary 5 includes place name dictionaries 51A, 51B, and 51C as a plurality of first dictionaries (hereinafter collectively referred to as the "place name dictionaries 51A-51C"), house number dictionaries 52AA, 52BB, and 52CC, and house number dictionaries 52BA, 52CA, 52AB, 52CB, 52AC, and 52BC as a plurality of second dictionaries. It should be noted that in the following description, the house number dictionaries 52BA, 52CA, 52AB, 52CB, 52AC, and 52BC are collectively referred to as the "house number dictionaries 52BA-52BC".

The place name dictionaries 51A-51C are dictionaries with which the language-specific voice recognition units 4A-4C perform voice recognition of a word or term in a glossary of place names (first glossary) using phonemes in the corresponding languages A-C, respectively. For example, the place name dictionary 51A defines a glossary of place names mainly used in the corresponding language A. By using the place name dictionary 51A, the language-specific voice recognition unit 4A is able to perform voice recognition to specify a place name in phonemes of the corresponding language A from input voice in phonemes of the corresponding language A.

However, as the phonemes in the corresponding language A are usually different from phonemes in the languages B and C, the language-specific voice recognition unit 4A is not able to perform voice recognition to specify the place name in phonemes of the corresponding language A from input voice in phonemes of different languages B and C that are different from the corresponding language A. This also applies to the language-specific voice recognition units 4B and 4C.

The house number dictionaries 52AA, 52BB, and 52CC are dictionaries with which the language-specific voice recognition units 4A-4C perform voice recognition of a word or term in a glossary of house numbers (house numbers) (second glossary) using phonemes in the corresponding languages A-C, respectively. For example, by using the house number dictionary 52AA, the language-specific voice recognition unit 4A is able to perform voice recognition to specify a house number in phonemes of the corresponding language A from input voice in phonemes of the corresponding language A. This also applies to the language-specific voice recognition units 4B and 4C.

The house number dictionaries 52BA and 52CA are dictionaries with which the language-specific voice recognition unit 4A perform voice recognition of a word or term in a glossary of house numbers (second glossary, a glossary of predetermined numbers) using phonemes in the respective different languages B and C substituted for phonemes in the corresponding language A.

FIG. 4 is a diagram illustrating the house number dictionaries 52AA, 52BA, and 52CA. As illustrated in FIG. 4, excluding the house number dictionary 52AA, phoneme mapping is applied to the house number dictionaries 52BA and 52CA.

The house number dictionary 52BA is a voice recognition dictionary in which for a word or term in a glossary of house numbers (second glossary, a glossary of predetermined numbers), a phoneme b in the different language B is mapped to one of phonemes a in the corresponding language A that is identical or most similar to the phoneme b. The house number dictionary 52CA is a voice recognition dictionary in which for a word or term in a glossary of house numbers (second glossary, a glossary of predetermined numbers), a phoneme c in the different language C is mapped to one of phonemes a in the corresponding language A that is identical or most similar to the phoneme c. It should be noted that for the phoneme mapping, the technique disclosed in Patent Document 1 may be employed, for example.

By using the house number dictionary 52AA, the language-specific voice recognition unit 4A is able to perform voice recognition to specify a house number in phonemes of the corresponding language A from input voice in phonemes of the corresponding language A.

By using the house number dictionary 52BA, the language-specific voice recognition unit 4A substitutes input voice in phonemes of the different language B for voice in phonemes of the corresponding language A that are identical or most similar, and is able to perform voice recognition to specify a house number in phonemes of the corresponding language A from the substituted input voice.

By using the house number dictionary 52CA, the language-specific voice recognition unit 4A substitutes input voice in phonemes of the different language C for voice in phonemes of the corresponding language A that are identical or most similar, and is able to perform voice recognition to specify a house number in phonemes of the corresponding language A from the substituted input voice.

In this manner, the language-specific voice recognition unit 4A is able to perform voice recognition using the house number dictionaries 52AA, 52BA, and 52CA.

While the house number dictionaries 52BA and 52CA are described in the above, the same applies to the house number dictionaries 52AB, 52CB, 52AC, and 52BC in FIGS. 2 and 3. In other words, the house number dictionaries 52AB and 52CB are voice recognition dictionaries used by the language-specific voice recognition unit 4B to substitute phonemes in the different languages A and C for phonemes in the corresponding language B to perform voice recognition of a word or term in a glossary of house numbers. In those dictionaries, for the word or term of the house number in the glossary, the phonemes in the different languages A and C are mapped to the phonemes in the corresponding language B. The house number dictionaries 52AC and 52BC are voice recognition dictionaries used by the language-specific voice recognition unit 4C to substitute phonemes in the different languages A and B for phonemes in the corresponding language C to perform voice recognition of a word or term in a glossary of house numbers. In those dictionaries, for the word or term for the house number in the glossary, the phonemes in the different languages A and B are mapped to the phonemes in the corresponding language C.

Out of the language-specific voice recognition units 4A-4C, the voice recognition language setting unit 6 sets a language-specific voice recognition unit to be used in voice recognition. In this Embodiment 1, it is assumed that a destination (e.g., a stopover or a final destination) in the navigation system described above is previously set by the user, and the voice recognition language setting unit 6 would set one language-specific voice recognition unit to be used in voice recognition based on the destination.

For example, the voice recognition language setting unit 6 previously stores a table associating a plurality of areas with languages mainly used in the respective areas. Then, the voice recognition language setting unit 6 acquires a language associated with an area to which a place name of the destination belongs from the table, and sets a language-specific voice recognition unit used in voice recognition in the acquired language.

In the following description, the language-specific voice recognition unit that has been set by the voice recognition language setting unit 6 is also referred to as a "set voice recognition unit".

Next, setting of a place name dictionary and a house number dictionary by the voice recognition dictionary setting unit 7 will be described.

The voice recognition dictionary setting unit 7 sets a place name dictionary, out of the place name dictionaries 51A-51C, with which the set voice recognition unit (a language-specific voice recognition unit set by the voice recognition language setting unit 6) performs voice recognition of a place name using phonemes in the corresponding language. For example, when the set voice recognition unit is the language-specific voice recognition unit 4A, the voice recognition dictionary setting unit 7 sets the place name dictionary 51A.

Further, when the system-set language (a language set by the navigation system) is the same as the corresponding language for the set voice recognition unit, the voice recognition dictionary setting unit 7 sets a house number dictionary, out of the house number dictionaries 52AA, 52BB, and 52CC, with which the set voice recognition unit performs voice recognition of a house number using phonemes in the corresponding language. For example, when the set voice recognition unit is the language-specific voice recognition unit 4A, and the system-set language is the corresponding language A for the language-specific voice recognition unit 4A, the voice recognition dictionary setting unit 7 sets the house number dictionary 52AA.

On the other hand, when the system-set language is not the same as the corresponding language for the set voice recognition unit but a different language, the voice recognition dictionary setting unit 7 sets a house number dictionary, out of the house number dictionaries 52BA-52BC, with which the set voice recognition unit performs voice recognition of a house number by substituting phonemes in the different language for phonemes in the corresponding language. For example, when the set voice recognition unit is the language-specific voice recognition unit 4A, and the system-set language is the different language B for the language-specific voice recognition unit 4A, the voice recognition dictionary setting unit 7 sets the house number dictionary 52BA. In other words, when the system-set language is a different language, the voice recognition dictionary setting unit 7 sets a house number dictionary in which the different language and the system-set language are the same, as a house number dictionary with which the set voice recognition unit uses to perform voice recognition by substituting phonemes in the different language for phonemes in the corresponding language.

It should be noted that the set voice recognition unit is configured such that voice recognition is performed to a predetermined first portion of the input voice in an input order, using a place name dictionary (any one of the place name dictionaries 51A-51C). Further, the set voice recognition unit is configured such that voice recognition is performed to a predetermined second portion of the input voice in the input order, using a house number dictionary (any one of the house number dictionaries 52AA, 52BB, and 52CC, and the house number dictionaries 52BA-52BC).

Here, in general, as a place name is often uttered before a house number in a single utterance for voice input of an address, it is assumed that in this Embodiment 1, the first portion is applied to a first half of the input voice in the input order, and the second portion is applied to a latter half of the input voice in the input order.

Operation

FIG. 5 is a flowchart showing an operation of the voice recognition apparatus according to this Embodiment 1. It should be noted that in the following, a description is given taking a case in which an address of the destination is in Germany (a destination language is German), the system-set language is English, a language-specific voice recognition unit for German is the language-specific voice recognition unit 4A, a place name dictionary for German is the place name dictionary 51A, a house number dictionary in which phonemes in English are mapped to phonemes in German is the house number dictionary 52BA as an example. However, this is a mere example, and the present invention is not limited to this example.

First, in Step S1, the voice input unit 1 acquires (receives) voice (utterance) from the user. In Step S2, the voice introduction unit 2 generates a voice signal from the voice acquired by the voice input unit 1. In Step S3, the sound analyzer unit 3 analyzes the voice signal, and converts the voice signal into a vector sequence, a chronological sequence, or the like, of acoustic features.

In Step S4, out of the language-specific voice recognition units 4A-4C, the voice recognition language setting unit 6 sets (selects) a language-specific voice recognition unit based on the destination. In the above example, as the destination has a place name in Germany, the voice recognition language setting unit 6 sets the language-specific voice recognition unit 4A for German. Specifically, the set voice recognition unit is the language-specific voice recognition unit 4A for German.

In Step S5, the voice recognition dictionary setting unit 7 sets (selects) a place name dictionary, out of the place name dictionaries 51A-51C, with which the set voice recognition unit performs voice recognition of a place name using phonemes in the corresponding language. In the above example, as the set voice recognition unit is the language-specific voice recognition unit 4A for German, the voice recognition dictionary setting unit 7 sets the place name dictionary 51A for German.

In Step S6, the voice recognition dictionary setting unit 7 sets (selects) a house number dictionary, out of the house number dictionaries 52AA, 52BB, and 52CC and the house number dictionaries 52BA-52BC, with which the set voice recognition unit performs voice recognition of a house number using phonemes in the system-set language. In the above example, as the set voice recognition unit is the language-specific voice recognition unit 4A for German and the system-set language is English, the voice recognition dictionary setting unit 7 sets the house number dictionary 52BA in which phonemes in English are mapped to phonemes in German.

In Step S7, the voice recognition unit 4 refers to the voice recognition dictionary 5 and performs voice recognition for acoustic data that has been subjected to the sound analysis to output a recognition result that is most probable. In the above example, the language-specific voice recognition unit 4A for German performs voice recognition using the place name dictionary 51A to the first half of the input voice in the input order, and performs voice recognition using the house number dictionary 52BA in which mapping has been applied to the latter half of the input voice in the input order. The recognition result output from the voice recognition unit 4 in Step S7 is output as voice from a loudspeaker that is not illustrated or displayed in a display device that is not illustrated. Then, the operation in FIG. 5 ends.

Conclusion of Embodiment 1

As one example, a case in which an Englishman as a user (English being the system-set language) performs voice input of an address in Germany as the destination is assumed. In this case, it is expected that the Englishman utters a place name in Germany (e.g., "Stuttgart Neckar strasse") in German pronunciation, and then a house number (e.g., "one, two, three") in English pronunciation.

Here, the voice recognition apparatus according to this Embodiment 1 is able to perform voice recognition to "Stuttgart Neckar strasse", for example, using a first dictionary (the place name dictionaries 51A-51C). Then, the voice recognition apparatus according to this Embodiment 1 is able to perform voice recognition to "one, two, three", for example, using a second dictionary in which phoneme mapping has been applied (the house number dictionaries 52BA-52BC). According to such a configuration, for example, it is possible to perform voice recognition of a single utterance containing a plurality of languages such as German and English. Further, by not performing phoneme mapping to place names and the like, it is possible to reduce a ratio of the voice recognition dictionaries having a relatively large data size and in which phoneme mapping has been applied. As a result, it is possible to reduce data size of the voice recognition dictionaries. In addition, reduction of false recognition is also expected.

Further, the voice recognition apparatus according to this Embodiment 1 performs voice recognition to the predetermined first portion of the input voice in the input order using the place name dictionary, and voice recognition to the predetermined second portion of the input voice in the input order using the house number dictionary. With this, it is possible to improve accuracy in voice recognition.

Variations of Embodiment 1

In Embodiment 1, the second glossary of each of the second dictionaries in which phoneme mapping has been applied (the house number dictionaries 52BA-52BC) is a glossary of house numbers. However, the present invention is not limited to such an example, and the second glossary of each of the second dictionaries may be a glossary of predetermined numbers such as postal codes.

Further, the second glossary of the second dictionary may be a glossary for a predetermined category of POI (point of interest) in a navigation system. Then, when the system-set language is a different language, the voice recognition dictionary setting unit 7 may set a second dictionary in which the different language and the system-set language are the same, as the second dictionary with which the set voice recognition unit performs voice recognition of a word or term in the glossary of the above category by substituting phonemes in the different language for phonemes in the corresponding language.

For example, a case in which voice "Aachener Dom" for POI in German is input after voice "World Heritage" for a POI category in English is input is assumed. In order to address such an assumption, it is possible to provide a configuration in which the language-specific voice recognition unit 4A for German performs voice recognition for the first half portion of the input voice in the input order using the second dictionary in which phonemes in English are mapped to phonemes in German, and performs voice recognition for the latter half portion of the input voice in the input order using the first dictionary in German. Even with such a configuration, it is also possible to obtain the same effect for category and POI as in Embodiment 1.

Further, the second glossary of the second dictionary may be a glossary of predetermined commands for the navigation system. Then, when the system-set language is a different language, the voice recognition dictionary setting unit 7 may set a second dictionary whose different language and the system-set language are the same, as the second dictionary with which the set voice recognition unit performs voice recognition of a word or term in the glossary for the above commands by substituting phonemes in the different language for phonemes in a corresponding language.

For example, a case in which voice "Aachener Dom" for POI in German is input after voice "Navigate to" for a command in English is input is assumed. In order to address such an assumption, it is possible to provide a configuration in which the language-specific voice recognition unit 4A for German performs voice recognition for the first half portion of the input voice in the input order using the second dictionary in which phonemes in English are mapped to phonemes in German, and performs voice recognition for the latter half portion of the input voice in the input order using the first dictionary in German. Even with such a configuration, it is also possible to obtain the same effect as in Embodiment 1. Here, for example, the same applies to cases in which voice indicating a music name in German is input after voice "Play" for a command in English is input, and in which voice indicating a human name in German is input after voice "Call" for a command in English is input.

It should be noted that according to the configuration described in Embodiment 1, a first dictionary to which phoneme mapping is not performed is used for place names and a second dictionary in which phoneme mapping is applied is used for house numbers. However, the present invention is not limited to such an example, a first dictionary in which phonemes are not mapped may be used for house numbers and a second dictionary in which phoneme mapping has been applied may be used for place names. However, as in Embodiment 1, it is possible to reduce a size of data for voice recognition dictionaries more efficiently when phonemes are mapped for house numbers that exist only in small numbers as compared to a case in which phonemes are mapped for place names that exist in large numbers.

It should be noted that the variations described above are also applicable in Embodiment 2 and the following that will be described below.

Embodiment 2

In Embodiment 1 it is assumed that a destination for the navigation system (e.g., a stopover, a final destination, or the like) are previously determined by the user, and based on the destination, the voice recognition dictionary setting unit 7 sets a language-specific voice recognition unit to be used in voice recognition. However, in practical use, the destination is often not set before utterance. Thus, as described above, in this Embodiment 2, it is possible to perform the same operation as in Embodiment 1 without previously setting the destination.

FIG. 6 is a block diagram illustrating a configuration of a voice recognition apparatus according to this Embodiment 2. Here, in the voice recognition apparatus according to this Embodiment 2, like and the same components as those described above will be denoted by the same reference numbers, and descriptions will be given mainly on differences.

The voice recognition apparatus illustrated in FIG. 6 further includes a voice storing unit 8 and a primary recognition result determining unit 9, in addition to the components shown in FIG. 3.

Here, the voice storing unit 8 corresponds to a storage device such as the memory 82 in FIG. 1. The primary recognition result determining unit 9 is realized, by the processor 81 in FIG. 1 executing programs stored in a storage device such as the memory 82, as a function of the processor 81. It should be noted that these functions may be realized by a plurality of processors 81 in cooperation.

The voice storing unit 8 temporarily stores the single input of voice (here, a vector sequence or a chronological sequence of acoustic features converted by the sound analyzer unit 3) in order to perform voice recognition to a single input of voice for a plurality of times by the voice recognition unit 4. It is sufficient if the voice storing unit 8 may be used every voice recognition, and such a voice storing unit 8 may be realized using a conventional technique. Therefore, a detailed description of the voice storing unit 8 and its operation will be omitted.

It should be noted that as described later in detail, in this Embodiment 2, the voice recognition unit 4 performs voice recognition to a single input of voice for two times. Through first voice recognition out of the two, a language for the destination is acquired. Specifically, after the first voice recognition is performed, the situation is substantially the same as the situation in which the destination is previously set. Then, as second voice recognition, voice recognition similarly to that in Embodiment 1 is performed.

Now, in this Embodiment 2, the voice recognition dictionaries 5 include a plurality of place name dictionaries 51A-51C, house number and command dictionaries 53AA, 53BB, and 53CC, and house number and command dictionaries 53BA, 53CA, 53AB, 53CB, 53AC, and 53BC as a plurality of second dictionaries. In the following description, the house number and command dictionaries 53BA, 53CA, 53AB, 53CB, 53AC, and 53BC are collectively referred to as "the house number and command dictionaries 53BA-53BC". In addition, the voice recognition dictionaries 5 further include command and garbage dictionaries 54A, 54B, and 54C (hereinafter collectively referred to as "the command and garbage dictionaries 54A-54C") as a plurality of third dictionaries.

Among the voice recognition dictionaries 5, the place name dictionaries 51A-51C are the same as the place name dictionaries 51A-51C according to Embodiment 1.

The house number and command dictionaries 53AA, 53BB, and 53CC are dictionaries in which the house numbers in the house number dictionaries 52AA, 52BB, and 52CC according to Embodiment 1 are replaced with house numbers and commands for the navigation system. Therefore, for example, by using the house number and command dictionary 53AA, the language-specific voice recognition unit 4A is able to perform voice recognition for specifying a house number and a command in the phonemes of the corresponding language A from input voice in the phonemes of the corresponding language A. Here, the commands for the navigation system include "Navigate to Germany", "Navigate to French" and the like.

The house number and command dictionaries 53BA-53BC are dictionaries in which the house numbers in the house number dictionaries 52BA-52BC according to Embodiment 1 are replaced with house numbers and commands for the navigation system. Therefore, for example, by using the house number and command dictionary 53BA, the language-specific voice recognition unit 4A is able to substitute phonemes of the different language B for phonemes of the corresponding language A from input voice in the phonemes of the different language B, and to perform voice recognition for specifying a house number and a command in the phonemes of the corresponding language A from input voice after the substitution.

The command and garbage dictionaries 54A-54C are dictionaries with which the respective language-specific voice recognition units 4A-4C perform the first voice recognition including garbage recognition using phonemes in the corresponding language.

Here, in the following, a description is given taking a case in which the corresponding language A for the command and garbage dictionary 54A is German, and the commands for the navigation system such as "navigieren Deutschland" and "navigieren Frankreich" are set in the command and garbage dictionary 54A as an example. Further, a description is given taking a case in which the corresponding language B for the command and garbage dictionary 54B is English, and the commands for the navigation system such as "Navigate to Germany" and "Navigate to French" are set in the command and garbage dictionary 54B as an example. However, these are mere examples, and the present invention is not limited to these examples.

Now, garbage recognition is a recognition method for performing recognition using a garbage acoustic model. According to such garbage recognition, it is possible to output, for any utterance, a recognition score indicating a matching degree between the utterance and some of words and terms in a dictionary.

As one example, it is assumed that the language-specific voice recognition unit 4B for English performs voice recognition including garbage recognition using the command and garbage dictionary 54B. In this case, no matter which input voice is "Navigate to Germany Stuttgart Neckar strasse" or "Navigate to Germany Aachener Dom", the language-specific voice recognition unit 4B gives a higher recognition score to a result of voice recognition for "Navigate to Germany < . . . >" than to a result of voice recognition for "Navigate to French < . . . >". Here, < . . . > is generally a symbol indicating a result of garbage recognition.

In this Embodiment 2, the above garbage recognition is performed to a plurality of predetermined commands for the navigation system. Further, it is assumed that each of the commands includes a word or term indicating at least one of a place name, a country name, and a language used in those areas that may be set as a destination of the navigation system (e.g., Deutschland, Frankreich, Germany, French, and the like).

The primary recognition result determining unit 9 determines the language to be used in the second voice recognition based on a result of garbage recognition included in a result of the first voice recognition using the command and garbage dictionaries 54A-54C. In this Embodiment 2, the primary recognition result determining unit 9 determines one of the plurality of commands based on the result of garbage recognition, and determines a language to be used in the second voice recognition based on a word or term indicating at least one of a place name, a country name, and a language used in those areas included in this one command.

As one example, it is assumed a recognition score for "Navigate to Germany < . . . >" is highest as a result of garbage recognition included in a result of the first voice recognition using the command and garbage dictionaries 54A-54C. In this case, the primary recognition result determining unit 9 determines "Navigate to Germany" having the highest recognition score to be the one command as described above, out of the plurality of commands, and determines the language to be used in the second voice recognition to be "German" based on "Germany" included in this one command.

When the system-set language is a different language, the voice recognition dictionary setting unit 7 sets a house number and command dictionary in which the different language and the system-set language are the same, as the house number and command dictionaries 53BA-53BC with which the set voice recognition unit performs voice recognition of a house number and a command (second glossary) by substituting phonemes in the different language for phonemes in the corresponding language.

Operation

FIG. 7 is a flowchart showing an operation of the voice recognition apparatus according to this Embodiment 2. It should be noted that in the following, a description is given taking a case in which the system-set language is English, a language-specific voice recognition unit for German is the language-specific voice recognition unit 4A, a language-specific voice recognition unit for English is the language-specific voice recognition unit 4B, a place name dictionary for German is the place name dictionary 51A, a house number and command dictionary in which phonemes in English are mapped to phonemes in German is the house number and command dictionary 53BA, and a command and garbage dictionary in English is the command and garbage dictionary 54B as an example. The description is also given taking a case in which a command "Navigate to Germany" in English pronunciation, a place name "Stuttgart Neckar strasse" in German pronunciation, and a house number "one, two, three" in English pronunciation are input in this order as an example. However, these are mere examples, and the present invention is not limited to these examples.

First, in Step S11-S13, the same operation as in Step S1-S3 according to Embodiment 1 is carried out.

Then, in Step S14, the voice storing unit 8 stores a vector sequence, a chronological sequence, or the like, of acoustic features converted by the sound analyzer unit 3.

In Step S15, out of the language-specific voice recognition units 4A-4C, the voice recognition language setting unit 6 sets a language-specific voice recognition unit to be used in the first voice recognition based on the system-set language. In the above example, as the system-set language is English, the voice recognition language setting unit 6 sets the language-specific voice recognition unit 4B for English. Here, in the following description, the language-specific voice recognition unit set by the voice recognition language setting unit 6 in Step S15 is also referred to as a "first set voice recognition unit".

In Step S16, the voice recognition dictionary setting unit 7 sets a command and garbage dictionary, out of the command and garbage dictionaries 54A-54C, with which the first set voice recognition unit performs voice recognition including garbage recognition using phonemes in the corresponding language. In the above example, as the first set voice recognition unit is the language-specific voice recognition unit 4B for English, the voice recognition dictionary setting unit 7 sets the command and garbage dictionary 54B for English.

In Step S17, the voice recognition unit 4 refers to the voice recognition dictionary 5 and performs first voice recognition for acoustic data that has been subjected to the sound analysis to output a recognition result that is most probable. In the above example, the language-specific voice recognition unit 4B for English performs voice recognition including garbage recognition using the command and garbage dictionary 54B to input voice of "Navigate to Germany Stuttgart Neckar strasse one, two, three". As a result of the garbage recognition, a highest recognition score is given to the command "Navigate to Germany < . . . >".

In Step S18, the primary recognition result determining unit 9 determines one of the plurality of commands based on the result of garbage recognition, and determines a language to be used in the second voice recognition based on a word or term indicating at least one of a place name, a country name, and a language used in those areas included in this one command. In other words, the primary recognition result determining unit 9 determines the language substantially the same as the language of the destination in Embodiment 1.

In the above example, the primary recognition result determining unit 9 determines "Navigate to Germany" having the highest recognition score out of the plurality of commands, and determines the language to be used in the second voice recognition, that is, the language of the destination, to be "German" based on "Germany" included in this one command.

In Step S19, an operation that is the same as in Step S4 according to Embodiment 1 is performed. Specifically, out of the language-specific voice recognition units 4A-4C, the voice recognition language setting unit 6 sets, as the language-specific voice recognition unit to be used in the second voice recognition, a language-specific voice recognition unit based on the language determined by the primary recognition result determining unit 9. In the above example, as the language of the destination is German, the voice recognition language setting unit 6 sets the language-specific voice recognition unit 4A for German. Here, in the following description, the language-specific voice recognition unit set by the voice recognition language setting unit 6 in Step S19 is also referred to as a "second set voice recognition unit".

In Step S20, an operation similar to Step S5 according to Embodiment 1 is performed. Specifically, the voice recognition dictionary setting unit 7 sets a place name dictionary, out of the place name dictionaries 51A-51C, with which the second set voice recognition unit performs voice recognition of a place name (first glossary) using phonemes in the corresponding language. In the above example, as the second set voice recognition unit is the language-specific voice recognition unit 4A for German, the voice recognition dictionary setting unit 7 sets the place name dictionary 51A for German.

In Step S21, an operation that is the same as in Step S6 according to Embodiment 1 is performed. Specifically, the voice recognition dictionary setting unit 7 sets a house number and command dictionary, out of the house number and command dictionaries 53AA, 53BB, and 53CC, and the house number and command dictionaries 53BA-53BC, with which the second set voice recognition unit performs voice recognition of a house number and command (second glossary) using phonemes in the system-set language. In the above example, as the second set voice recognition unit is the language-specific voice recognition unit 4A for German and the system-set language is English, the voice recognition dictionary setting unit 7 sets the house number and command dictionary 53BA in which phonemes in English are mapped to phonemes in German.

In Step S22, a vector sequence and a chronological sequence of acoustic features stored in the voice storing unit 8, that is, a vector sequence and a chronological sequence of acoustic features that are the same as the acoustic features to which the first voice recognition is performed, are input to the voice recognition unit 4.

In Step S23, the voice recognition unit 4 refers to the voice recognition dictionary 5 and performs second voice recognition for acoustic data that has been input to output a recognition result that is most probable. In the above example, the language-specific voice recognition unit 4A for German performs voice recognition using the place name dictionary 51A to the input voice "Stuttgart Neckar strasse", and performs voice recognition using the house number and command dictionary 53BA in which mapping has been applied to the input voice "Navigate to Germany" and the input voice "one, two, three". The recognition result output from the voice recognition unit 4 in Step S23 is output as voice from a loudspeaker that is not illustrated or displayed in a display apparatus that is not illustrated. Then, the operation in FIG. 7 ends.

Conclusion of Embodiment 2

With the voice recognition apparatus according to this Embodiment 2 as described above, it is also possible to obtain the same effects as Embodiment 1. Further, according to this Embodiment 2, a language for the destination is acquired by performing first voice recognition including garbage recognition to a single input of voice, and voice recognition that is the same as in Embodiment 1 is performed to the single input of voice by performing second voice recognition in which the language for the destination is set. Therefore, it is possible to eliminate a trouble to previously set a destination.

Variations of Embodiment 2

In Embodiment 2, in the second voice recognition, voice recognition using a house number and command dictionary in which mapping has been applied to a command part of input voice (a vector sequence or a chronological sequence of acoustic features) is performed. However, the present invention is not limited to such an example, and as long as a command part (e.g., "Navigate to Germany") may be removed from input voice (a vector sequence or a chronological sequence of acoustic features), it is possible to perform voice recognition using a place name dictionary to a first half portion of the remaining part (e.g., "Stuttgart Neckar strasse one, two, three"), and to perform voice recognition using house number dictionary to a latter half portion. In other words, in this case, instead of using the house number and command dictionaries 53AA, 53BB, 53CC, and 53BA-53BC, the house number dictionaries 52AA, 52BB, 52CC, and 52BA-52BC may be used similarly to Embodiment 1.

Further, while in Embodiment 2, the case in which a language for the destination is not set is described, the present invention is not limited to such an example. For example, in a case in which a language of a person's name to be searched is not set, and a command "Call Japanese" in English pronunciation and then a person's name "Yamada Taro" in Japanese pronunciation are input in this order, voice recognition may be performed in the same manner as described above.

Other Variations

In the above description, the voice recognition unit 4 is realized by the processor 81 in FIG. 1 executing a program stored in a storage device such as the memory 82. However, the voice recognition apparatus is not limited to the voice recognition unit 4 realized as software in this manner, and may be realized as hardware having a function that is the same as that of the voice recognition unit 4. In other words, it is sufficient that the voice recognition apparatus includes a voice recognition processing circuit as a broader concept common to the voice recognition unit 4 realized as software, and hardware having a function that is the same as that of the voice recognition unit 4.

Further, the voice recognition apparatus may include a language-specific voice recognition processing circuit as a broader concept of the language-specific voice recognition units 4A-4C, a similar voice recognition language setting processing circuit as a broader concept of the voice recognition language setting unit 6, and a similar voice recognition dictionary setting processing circuit as a broader concept of the voice recognition dictionary setting unit 7. Similarly, the voice recognition apparatus according to Embodiment 2 may include a similar primary recognition result determination processing circuit as a broader concept of the primary recognition result determining unit 9.

Moreover, the voice recognition apparatus described above includes a voice recognition system configured as a system appropriately combining not only the navigation device that can be mounted on vehicles, but a Portable Navigation Device, a communication terminal (e.g., a mobile terminal such as a mobile phone, a smartphone, or a tablet), and a function of an application installed therein, as well as a server. In this case, the functions and the components of the voice recognition apparatus described above may be provided for devices constituting the system in a distributed manner, or provided for one of such devices in a concentrated manner.

It should be noted that the present invention may be, within the scope of the invention, combining the embodiments and the variations freely, or may alter or omit any of the embodiments and the variations appropriately.

While the present invention has been described in detail, the above description is illustrative only throughout the aspects, and the present invention is not limited to the description. It is understood that numerous variations that are not illustrated may be conceivable without departing from the scope of the present invention.

REFERENCE SIGNS LIST

4: voice recognition unit
4A, 4B, 4C: language-specific voice recognition unit
5: voice recognition dictionary

6: voice recognition language setting unit

7: voice recognition dictionary setting unit

8: voice storing unit

9: primary recognition result determining unit

51A, 51B, 51C: place name dictionary

52AA, 52BA, 52CA, 52AB, 52BB, 52CB, 52AC, 52BC, 52CC: house number dictionary

53AA, 53BA, 53CA, 53AB, 53BB, 53CB, 53AC, 53BC, 53CC: house number and command dictionary

54A, 54B, 54C: command and garbage dictionary.

The invention claimed is:

1. A voice recognition apparatus for a navigation system comprising:

a voice recognition dictionary defining a glossary which is a target for voice recognition; and a voice recognition processing circuit configured to acquire a voice inputted by a user of the navigation system, convert said inputted voice into a digital signal, and perform voice recognition on said digital signal of said inputted voice using said voice recognition dictionary to recognize an address of a destination to be navigated by said navigation system, wherein said voice recognition processing circuit includes a plurality of language-specific voice recognition processing circuits capable of performing said voice recognition using phonemes in respective predetermined languages, said voice recognition dictionary includes a plurality of first dictionaries with which each of said plurality of language-specific voice recognition processing circuits performs said voice recognition of a first glossary which is one of said glossary using phonemes in the corresponding language as said language that corresponds to each of the language-specific voice recognition processing circuits, and a plurality of second dictionaries each being used by each of said plurality of language-specific voice recognition processing circuits to substitute phonemes in a different language as said language different from said corresponding language for phonemes in the said corresponding language to perform said voice recognition of a second glossary which is another of said glossary, the second dictionaries in each of which, for said second glossary, phonemes in said different language are mapped to phonemes in said corresponding language, the voice recognition apparatus further comprises:

a voice recognition language setting processing circuit configured to select and set said language-specific voice recognition processing circuit to be used in said voice recognition, out of said plurality of language-specific voice recognition processing circuits; and a voice recognition dictionary setting processing circuit configured to select and set, out of said plurality of first dictionaries, said first dictionary with which said language-specific voice recognition processing circuit selected and set by said voice recognition language setting processing circuit performs said voice recognition of said first glossary using phonemes in said corresponding language; and to select and set, out of said plurality of second dictionaries, said second dictionary with which said language-specific voice recognition processing circuit selected and set by said voice recognition language setting processing circuit performs said voice recognition of said second glossary by substituting phonemes in said different language for phonemes in said corresponding language, wherein said language-specific voice recognition processing circuit to be used in said voice recognition and said first dictionary for performing said voice recognition of said first glossary using phonemes in said corresponding language are selected and set based on a destination of said navigation system, said second dictionary with which said language-specific voice recognition processing circuit selected and set by said voice recognition language setting processing circuit performs said voice recognition of said second glossary by substituting phonemes in said different language for phonemes in said corresponding language is selected and set based on the language set in said navigation system, said first glossary of each said first dictionaries includes a glossary for place name, and said second glossary of each said second dictionaries includes at least one of a glossary for house number, a glossary for a predetermined category of POI (point of interest) in a navigation system, and a glossary for predetermined commands of said navigation system.

2. The voice recognition apparatus according to claim 1, wherein said language-specific voice recognition processing circuit selected and set by said voice recognition language setting processing circuit performs voice recognition to the predetermined first portion of said input voice in the input order using said first dictionary, and voice recognition to the predetermined second portion of said input voice in the input order using said second dictionary.

3. The voice recognition apparatus according to claim 1, further comprising;

a storage device storing a single input of voice in order to perform voice recognition to the single input of voice for a plurality of times by said voice recognition processing circuit; and a primary recognition result determination processing circuit, wherein said voice recognition dictionary further includes a plurality of third dictionaries with which said plurality of language-specific voice recognition processing circuits respectively perform a first of said voice recognition including garbage recognition using phonemes in said corresponding language, said voice recognition language setting processing circuit selects and sets said language-specific voice recognition processing circuit to be used in said first of said voice recognition out of said plurality of language-specific voice recognition processing circuits based on the language set in a navigation system, said voice recognition dictionary setting processing circuit selects and sets, out of said plurality of third dictionaries, said third dictionary with which said language-specific voice recognition processing circuit to be used in said first of said voice recognition selected and set by said voice recognition language setting processing circuit performs said first voice recognition including said garbage recognition using phonemes in said corresponding language, said primary recognition result determination processing circuit determines, said language to be used in second voice recognition based on a result of said garbage recognition included in a result of said first voice recognition using said third dictionary, said voice recognition language setting processing circuit selects and sets said language-specific voice recognition processing circuit to be used in said second of said voice recognition out of said plurality of language-specific voice recognition processing circuits based on said language determined by said primary recognition result determination processing circuit, and said voice recognition dictionary setting processing circuit selects and sets, out of said plurality of first dictionaries, said first dictionary with which said language-specific voice recognition processing circuit to be used in said second of said voice recognition selected and set by said voice recognition language setting processing circuit performs said voice recognition of said first glossary using phonemes in said corresponding language, and selects and sets out of said plurality of second dictionaries, said second dictionary with which said language-specific voice recognition processing circuit to be used in said second of said voice recognition selected and set by said voice recognition language setting processing circuit performs said voice recognition of said second glossary by substituting phonemes in said different language for phonemes in said corresponding language.

4. The voice recognition apparatus according to claim 3, wherein said garbage recognition is performed to, a plurality of predetermined commands in said navigation system, and each of said commands includes a word or term indicating at least one of a place name, a country name, and a language used in such areas that may be set as a destination of said navigation system.

5. The voice recognition apparatus according to claim 4, wherein said primary recognition result determination processing circuit determines one of said plurality of commands based on a result of said garbage recognition, and determines a language to be used in said second said voice recognition based on a word or term indicating at least one of said place name, said country name, and said language included in the one command.

6. A voice recognition method performed by a navigation system comprising the steps of:

preparing a voice recognition dictionary defining a glossary which is a target for voice recognition;

acquiring a voice inputted by a user of said navigation system;

converting said inputted voice into a digital signal; and performing voice recognition on said digital signal of said inputted voice using said voice recognition dictionary to recognize an address of a destination to be navigated by said navigation system, wherein performing said voice recognition includes preparing a plurality of language-specific voice recognition processing circuits capable of performing said voice recognition using phonemes in respective predetermined languages, preparing said voice recognition dictionary includes preparing a plurality of first dictionaries with which each of said plurality of language-specific voice recognition processing circuits performs said voice recognition of a first glossary which is one of said glossary using phonemes in the corresponding language as said language that corresponds to each of the language-specific voice recognition processing circuits, and a plurality of second dictionaries each being used by each of said plurality of language-specific voice recognition processing circuits to substitute phonemes in a different language as said language different from said corresponding language for phonemes in the said corresponding language to perform said voice recognition of a second glossary which is another of said glossary, the second dictionaries in each of which, for said second glossary, phonemes in said different language are mapped to phonemes in said corresponding language, said voice recognition method further comprises:

selecting and setting said language-specific voice recognition processing circuit to be used in said voice recognition, out of said plurality of language-specific voice recognition processing circuits; and selecting and setting, out of said plurality of first dictionaries, said first dictionary with which said language-specific voice recognition processing circuit performs said voice recognition of said first glossary using phonemes in said corresponding language, and out of said plurality of second dictionaries, said second dictionary with which said language-specific voice recognition processing circuit performs said voice recognition of said second glossary by substituting phonemes in said different language for phonemes in said corresponding language, wherein said language-specific voice recognition processing circuit to be used in said voice recognition and said first dictionary for performing said voice recognition of said first glossary using phonemes in said corresponding language are selected and set based on a destination of said navigation system, said second dictionary with which said language-specific voice recognition processing circuit selected and set performs said voice recognition of said second glossary by substituting phonemes in said different language for phonemes in said corresponding language is selected and set based on the language set in said navigation system, said first glossary of each said first dictionaries includes a glossary for place name, and said second glossary of each said second dictionaries includes at least one of a glossary for house number, a glossary for a predetermined category of POI (point of interest) in a navigation system, and a glossary for predetermined commands of said navigation system.

7. The voice recognition apparatus according to claim 1, wherein each of said plurality of second dictionaries are configured to be used for substituting phonemes in a singular language, which is said language different from said corresponding language, for phonemes in a singular other language, which is said corresponding language.

8. The voice recognition method according to claim 6, wherein each of said plurality of second dictionaries are configured to be used for substituting phonemes in a singular language, which is said language different from said corresponding language, for phonemes in a singular other language, which is said corresponding language.

* * * * *